United States Patent
Moon et al.

(10) Patent No.: US 12,213,235 B2
(45) Date of Patent: Jan. 28, 2025

(54) WIRELESS POWER TRANSMISSION APPARATUS FOR INDUCTION HEATING AND CONTROL METHOD THEREOF

(71) Applicant: LG Electronics Inc., Seoul (KR)

(72) Inventors: Hyunwook Moon, Seoul (KR); Euisung Kim, Seoul (KR); Yangkyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 597 days.

(21) Appl. No.: 17/186,923

(22) Filed: Feb. 26, 2021

(65) Prior Publication Data

US 2021/0298136 A1 Sep. 23, 2021

(30) Foreign Application Priority Data

Feb. 27, 2020 (KR) .................. 10-2020-0024271

(51) Int. Cl.
*H05B 6/12* (2006.01)
*H02J 50/12* (2016.01)
(Continued)

(52) U.S. Cl.
CPC ............ *H05B 6/1236* (2013.01); *H02J 50/12* (2016.02); *H02J 50/60* (2016.02); *H05B 6/062* (2013.01);
(Continued)

(58) Field of Classification Search
None
See application file for complete search history.

(56) References Cited

U.S. PATENT DOCUMENTS

2012/0305546 A1* 12/2012 Filippa et al. ............ H05B 6/04
219/660
2014/0158680 A1* 6/2014 Kitaizumi et al. ....... H05B 6/06
(Continued)

FOREIGN PATENT DOCUMENTS

JP 2016046122 A * 4/2016 ............. Y02B 40/00
JP 2019526910 A * 9/2019 ........... H05B 1/0261
(Continued)

OTHER PUBLICATIONS

Machine translation of JP 2019526910 A performed on Jun. 6, 2023, Vengroff et al. (Year: 2019).*
(Continued)

*Primary Examiner* — Dana Ross
*Assistant Examiner* — Kevin Guanhua Wen
(74) *Attorney, Agent, or Firm* — Fish & Richardson P.C.

(57) ABSTRACT

A wireless power transmission apparatus for induction heating includes: a working coil that is configured to change operation based on selection of a mode of operation from among a plurality of operating modes, the plurality of operating modes including a wireless power transmission mode configured to wirelessly transmit power and a heating mode configured to heat one or more objects, an inverter that is configured to output, to the working coil, current at an operation frequency, and a controller. The controller is configured to detect a target object, and determine, in the wireless power transmission mode, whether the target object is (i) a device from among a first group of devices including a device with a reception coil or (ii) an induction heating device.

16 Claims, 10 Drawing Sheets

(51) Int. Cl.
*H02J 50/60* (2016.01)
*H05B 6/06* (2006.01)
*H02J 50/90* (2016.01)

(52) U.S. Cl.
CPC .......... *H02J 50/90* (2016.02); *H05B 2213/05* (2013.01); *H05B 2213/06* (2013.01)

(56) References Cited

U.S. PATENT DOCUMENTS

2019/0131824 A1* 5/2019 Suga et al. .............. H02J 50/12
2020/0029397 A1* 1/2020 Kwack et al. ........... H05B 6/06

FOREIGN PATENT DOCUMENTS

| KR | 20180095332 | 8/2018 | | |
|----|----|----|----|----|
| WO | WO2007107888 | 9/2007 | | |
| WO | WO 2019106494 A1 * | 6/2019 | .............. | A47J 27/09 |

OTHER PUBLICATIONS

Machine translation of JP 2016046122 A performed on Jun. 6, 2023, Saito et al. (Year: 2016).*
Machine translation of WO 2019106494 A1 performed on Jun. 7, 2023, Franco et al. (Year: 2019).*
Extended European Search Report in European Appln. No. 21159291.0, dated Jul. 21, 2021, 8 pages.

* cited by examiner

WIRELESS POWER TRANSMISSION APPARATUS FOR INDUCTION HEATING AND CONTROL METHOD THEREOF

CROSS-REFERENCE TO THE RELATED APPLICATION

The present disclosure claims priority to and the benefit of Korean Patent Application No. 10-2020-0024271, filed on Feb. 27, 2020, in the Korean Intellectual Property Office, the disclosure of which is incorporated herein by reference in its entirety.

TECHNICAL FIELD

The present disclosure relates to a wireless power transmission apparatus, and more particularly, to a wireless power transmission apparatus for induction heating and a control method thereof.

BACKGROUND

Wireless charging refers to a method of charging a device by wirelessly transmitting power through the atmosphere instead of a method of charging a device by transmitting power through a wire.

According to the basic principle of wireless charging, when alternating current (AC) flows into a transmission coil, a battery is charged by forming a magnetic field around the transmission coil, allowing AC to flow in a reception coil due to influence of the magnetic field, and rectifying the AC.

Various small-size kitchen utensils are used in a kitchen, that is, small home appliances require power supply, and thus, the appliances receive power by connecting an electric cord (power connection cable) that is separately included in the appliances to a socket. In this case, there is a problem in that a plurality of electric cords adversely affects management, safety, or space utilization.

Thus, recently, the demand for wireless power charging of small home appliances used in a kitchen has rapidly increased.

For example, devices that need to be heated using induced current among the small home appliances have increasingly been spread.

Such a heating device using induced current uses an induction method of heating the device via electron induction by generating a magnetic field and is operated in the same way as an electric range.

For example, a general electron induction heating device allows high-frequency current to flow in a working coil or heating coil installed therein.

When the high-frequency current flows in the working coil or the heating coil, a strong line of magnetic force is generated. The line of magnetic force generated in the working coil or the heating coil forms eddy current while being transmitted through a cooking tool. Thus, as eddy current flows in a cooking tool, heat is generated to heat a container itself, and materials in the container are heated as the container is heated.

As such, there is the increasing demand for a multi-functional wireless power transmission device that is capable of performing wireless charging as well as a heating apparatus for induction heating depending on a type of the small home appliance.

The multi-functional wireless power transmission device is capable of performing induction heating or wireless power transmission by changing a frequency using one working coil or heating coil according to a mode selected by a user.

When induction heating or wireless power transmission is performed on a target small home appliance of the multi-functional wireless power transmission device, the target small home appliance needs to be in a state appropriate for a corresponding mode. Thus, whether the target small home appliance includes a reception coil needs to be determined, which is referred to as load characteristic determination.

A conventional method discloses such load characteristic determination of detecting resonance current and determining whether a load is present and discloses that magnetic and nonmagnetic containers are distinguished by determining a material of a cooking container based on such load determination and an optimum operation frequency is selected based on the result.

However, the conventional method simply discloses that an optimized operation frequency is selected depending on a material of a container and induction heating is performed but does not disclose technology of selectively performing or terminating induction heating or wireless power transmission depending on a type of a target small home appliance.

A conventional system also discloses that a detection coil is present in a transmission-side system in order to detect a small home appliance in wireless power transfer, high-frequency current is supplied to a detection circuit unit, and thus, a detection frequency in a foreign object and a small home appliance is converted into voltage information, and presence of a foreign object is detected.

However, it can only distinguish between a small home appliance having a reception coil and a foreign object by detecting the foreign object in such wireless power transfer, and there is a problem in that an electronic product for receiving heat and heating contents using induction heating, such as a kitchen small home appliance without a reception coil, e.g., a wireless electric kettle or a wireless electric rice cooker, is not operated. In addition, a separate detection circuit unit and a detection coil are required, and thus, it is disadvantageous in terms of cost and space utilization.

SUMMARY

According to one aspect of the subject matter described in this application, a wireless power transmission apparatus for induction heating includes a working coil that is configured to change operation based on selection of a mode of operation from among a plurality of operating modes, the plurality of operating modes including a wireless power transmission mode configured to wirelessly transmit power and a heating mode configured to heat one or more objects, an inverter that is configured to output, to the working coil, current at an operation frequency, and a controller. The controller can be configured to detect a target object, and determine, in the wireless power transmission mode, whether the target object is (i) a device from among a first group of devices including a device with a reception coil or (ii) an induction heating device.

Implementations according to this aspect can include one or more of the following features. For example, in the wireless power transmission mode, the controller can operate in a preparation period prior to a normal wireless power transmission mode configured to perform wireless power transmission to the target object, and the determination of whether the target object is a device from among a first group of devices occurs in the preparation period.

In some implementations, the wireless power transmission apparatus can further include an upper glass arranged to receive the target object, and a user input unit configured to receive the selection of the mode of operation. In some examples, the controller can be configured to enter a target object detection mode to control the operation frequency and determine (i) whether the target object is the induction heating device comprising a device without a reception coil or a heating container, (ii) whether the target object is the device from among the first group of devices including the device with the reception coil, (iii) whether the target object is a foreign object, or (iv) whether no device is no present.

In some implementations, the controller can be configured to read, in the target object detection mode, input current applied to the inverter, perform integration on the input current, and determine the target object based on an integrated value of the input current. In some examples, based on amplitude of main power input at a time point when the amplitude of the main power has a reference value with respect to the integrated value of the input current being smaller than the reference value, the controller can be configured to extend the integrated value of the input current and compensate for a difference.

In some examples, based on the integrated value of the input current being equal to or greater than a first value, the target object can determined as the heating container, based on the integrated value of the input current being equal to or less than a second value, the target object can be determined as the device from the first group, and based on the integrated value of the input current being between the first value and the second value, the target object can be determined as the device without the reception coil. In some examples, based on the target object being determined as the device from the first group, the controller can be configured to perform, after the target object detection mode, communication pairing with the target object, receive induction voltage information from the target object through the communication pairing, and determine whether the target object is the device with the reception coil from the first group.

In some implementations, based on the induction voltage information being equal to or greater than a first threshold value, the controller can be configured to determine that the target object is the device with the reception coil. In some implementations, based on the target object being determined (i) as the device from the first group and (ii) not as the device with the reception coil, the wireless power transmission mode can be terminated. In some implementations, based on the target object being determined as the device without the reception coil, the controller can be configured to enter a recheck mode prior to the normal wireless power transmission mode, and the controller can be configured to, in the recheck mode, receive induction voltage information of the target object through the communication pairing and determine whether the target object is the device without the reception coil.

According to another aspect of the subject matter described in this application, a method of operating a wireless power transmission apparatus for induction heating, which includes a working coil that is configured to change operation based on selection of a mode of operation from among a plurality of operating modes, the plurality of operating modes including a wireless power transmission mode configured to wirelessly transmit power and a heating mode configured to heat one or more objects, includes checking whether the wireless power transmission mode or the heating mode is selected, a preparation operation including detecting a target object, and determining, in the wireless power transmission mode, whether the target object is (i) a device from among a first group of devices including a device with a reception coil or (ii) an induction heating device, and a normal operation mode operation including performing, based on the target object being determined as the device with the reception coil, the wireless power transmission.

Implementations according to this aspect can include one or more following features. For example, the preparation operation can further include a target object detection operation including detecting input current of an inverter while driving the inverter at a first operation frequency, and determining (i) whether the target object is the induction heating device comprising a device without a reception coil or a heating container, (ii) whether the target object is the device from among the first group of devices including the device with the reception coil, (iii) whether the target object is a foreign object, or (iv) whether no device is present, and an additional detection operation including changing the operating frequency to a second driving frequency, receiving information from the target object, and determining, based on the target object being determined as the device from the first group, whether the target object is the device with the reception coil.

In some examples, the target object detection operation can further include reading the input current a plurality of times for a predetermined time, performing integration on the input current, and determining the target object based on an integrated value of the input current. In some examples, the target object detection operation can include, based on amplitude of main power input at a time point when the amplitude of the main power has a reference value with respect to the integrated value of the input current being smaller than the reference value, extending the integrated value of the input current and compensating for a difference.

In some implementations, the input current can be counted at a zero-voltage point of the main power. In some examples, the target object detection operation can include, based on the integrated value of the input current being equal to or greater than a first value, determining the target object as the heating container, based on the integrated value of the input current being equal to or less than a second value, determining the target object as the device from the first group, and based on the integrated value of the input current being between the first value and the second value, determining the target object as the device without the reception coil.

In some implementations, the additional detection operation can further include performing communication pairing with the target object, receiving induction voltage information from the target object through the communication pairing, and determining whether the target object is the device with the reception coil. In some examples, based on the induction voltage information being equal to or greater than a first threshold value, the target object can be determined as the device with the reception coil. In some examples, based on the target object being determined (i) as the device from the first group and (ii) not as the device with the reception coil, the wireless power transmission mode can be terminated.

DETAILED DESCRIPTION

Figure 1:
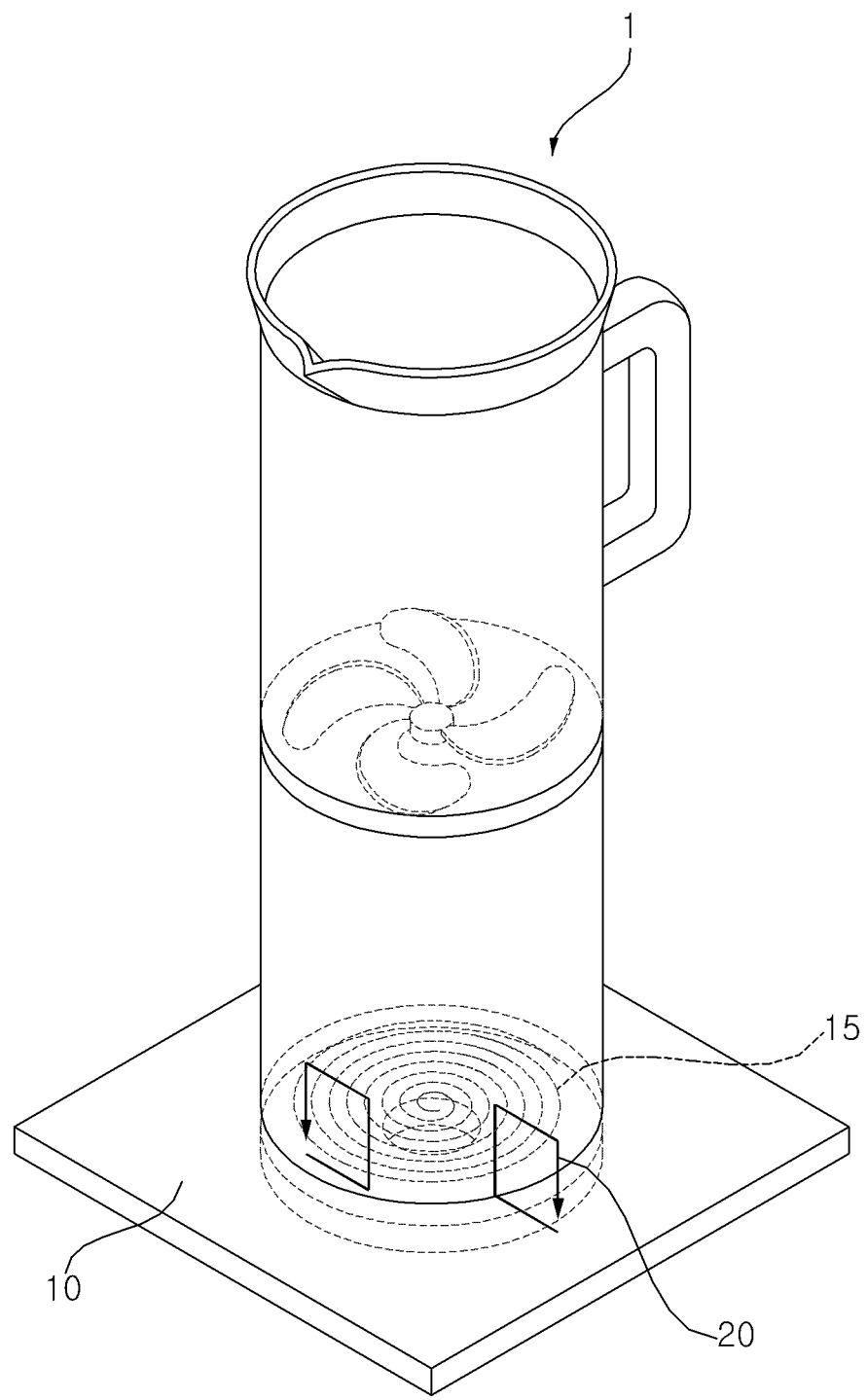
FIG. 1 is a diagram illustrating an upper perspective view of an exemplary wireless power transmission apparatus for induction heating.
Figure 2:
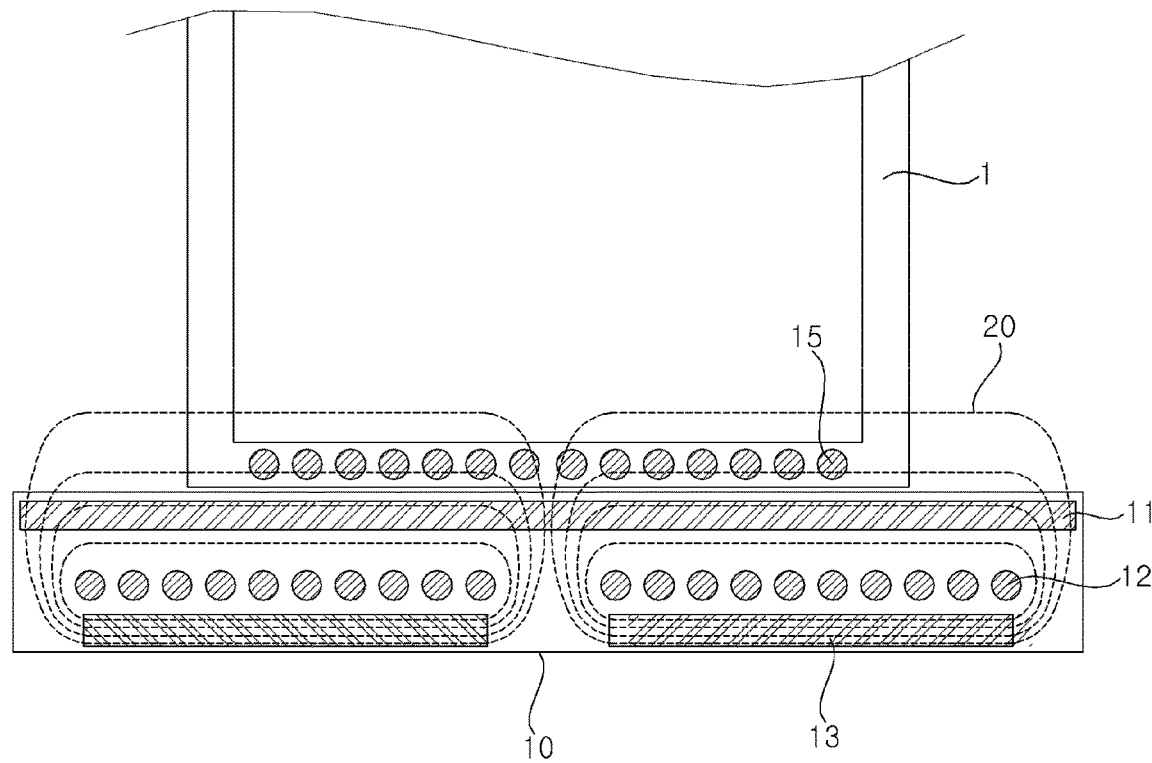
FIG. 2 is a diagram illustrating a cross-sectional view of the exemplary wireless power transmission apparatus for induction heating of FIG. 1.
Figure 3:
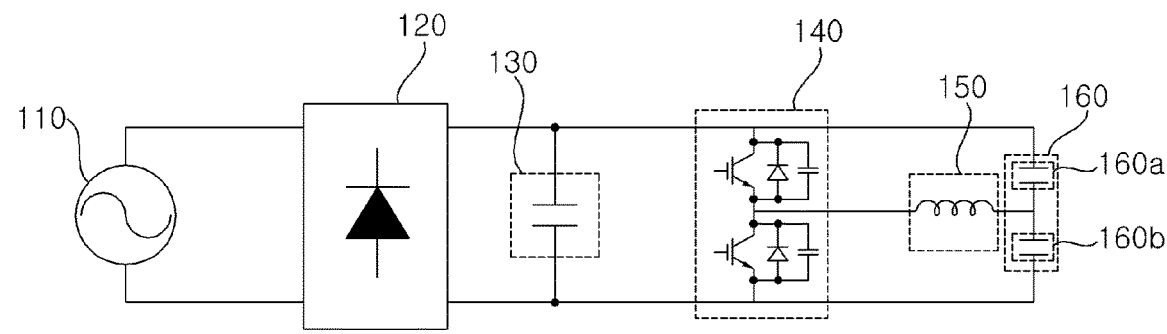
FIG. 3 is a circuit diagram for explaining an induction heating state.
Figure 4:
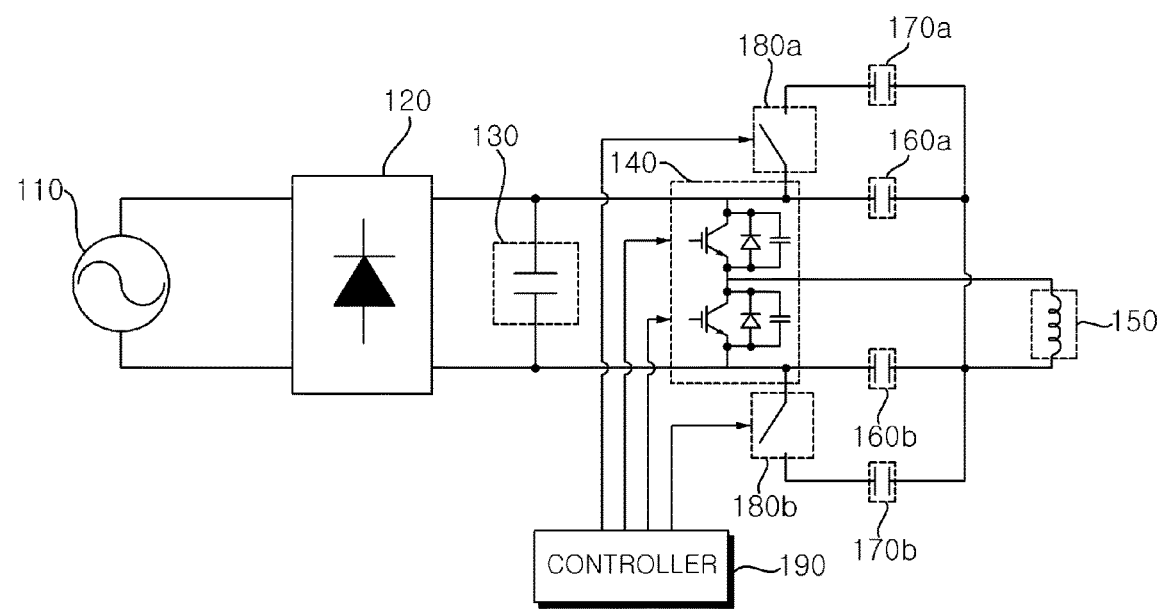
FIG. 4 is a circuit diagram for explaining wireless power transfer (WPT) of an exemplary wireless power transmission apparatus for induction heating.

FIG. 1 is a diagram illustrating an upper perspective view of an exemplary wireless power transmission apparatus 10 for induction heating. FIG. 2 is a diagram illustrating a cross-sectional view of the exemplary wireless power transmission apparatus 10 for induction heating of FIG. 1. FIG. 3 is a circuit diagram for explaining an induction heating state. FIG. 4 is a circuit diagram for explaining wireless power transfer (WPT) of the exemplary wireless power transmission apparatus 10 for induction heating.

Referring to FIGS. 1 and 2, a target object 1 can be positioned on a wireless power transmission apparatus 10. The wireless power transmission apparatus 10 can heat the target object 1 positioned thereon or can wirelessly transmit power to the target object 1.

The target object 1 can be a small home appliance having a reception coil 15, a small home appliance that does not have the reception coil 15, a general heating cooking container that is not an electronic product, or a foreign object.

The small home appliance having the reception coil 15 can wirelessly receive power using the reception coil 15 through the wireless power transmission apparatus 10 and can perform a main operation using the corresponding power. For example, the small home appliance can be a wireless blender or a wireless oven toaster.

The small home appliance that does not have the reception coil 15 can be a home appliance that is directly heated by generating a magnetic field through a working coil 12, which is a transmission coil of the wireless power transmission apparatus 10, and can be an electronic product that is not a general cooking container. An example thereof may be a wireless electric kettle or a wireless electric rice cooker. The small home appliance that does not have the reception coil 15 can include a pickup coil to supply power to a module that requires driving power from a region for performing a main operation, that is, a region except for a region that receives heat and performs a function. The pickup coil can be positioned away from a region corresponding to the working coil 12 that is a transmission coil, and can wirelessly receive power and can supply power to a module, for example, a control module such as a communication module, an interface, or a display.

The general cooking container may refer to a container including an electrical resistance component that can be heated by a magnetic field 20 generated from the working coil 12 and through which the magnetic field 20 passes. When a material of the cooking container includes an electrical resistance component, the magnetic field 20 can generate eddy current in the cooking container. The eddy current can heat the heating container, and the heat can be conducted and transmitted to an internal side of the cooking container. Thus, contents in the cooking container can be cooked.

When a foreign object is positioned at a position of the target object 1, the foreign object tends to be a material having an electrical resistance component that impedes wireless power transfer (WPT) and may be an iron bar such as a spoon or a chopstick.

The wireless power transmission apparatus 10 can function as an electronic induction heating apparatus or a wireless power transmission apparatus according to user's selection.

For example, the wireless power transmission apparatus 10 can function in an induction heating mode for heating a general heating container or can function in a wireless power transmission mode for wirelessly transmitting power to a small home appliance that has or does not have the reception coil 15 with respect to one working coil 12 according to the user's selection.

The multi-functional wireless power transmission apparatus 10 can include an upper glass 11 and a casing including at least on working coil 12, as shown in FIG. 2. First, components included in the wireless power transmission apparatus 10 will be described in detail.

The upper glass 11 can protect an internal part of the wireless power transmission apparatus 10 and can support the target object 1. For example, the upper glass 11 can be made of tempered glass of a ceramic material obtained by synthesizing various minerals. Thus, the upper glass 11 can protect an internal part of the wireless power transmission apparatus 10 from the outside. The upper glass 11 can support the target object 1 positioned thereon. Thus, the target object 1 can be positioned on the upper glass 11.

The working coil 12 can wirelessly transmit power to the target object 1 depending on the type of the target object 1 or a user mode selection, or can generate a magnetic field for heating, and at least one working coil 12 can be configured according to a design. In some implementations, a region in which the target object 1 is disposed can be determined depending on each coil 12.

A user input unit for determining a mode of the wireless power transmission apparatus can be disposed at one side of the upper glass 11.

For example, the working coil 12 can be disposed below the upper glass 11. Current may or may not flow in the working coil 12 depending on power on/off state of the wireless power transmission apparatus 10. When current flows in the working coil 12, the amount of current flowing in the working coil 12 can also vary depending on the mode and output of the wireless power transmission apparatus 10.

When current flows in the working coil 12, the working coil 12 can generate the magnetic field 20. As the amount of current flowing in the working coil 12 is increased, the generated magnetic field 20 can also increase.

A direction of the magnetic field 20 generated by the working coil 12 can be determined depending on a direction of the current flowing in the working coil 12. Thus, when alternating current (AC) flows in the working coil 12, the direction of the magnetic field 20 can be converted by a frequency of the AC. For example, when AC of 60 Hz flows in the working coil 12, the direction of the magnetic field can be converted 60 times per second.

A driving module that is electrically connected to the user input unit and the working coil 12, can receive a voltage and current from a commercially available power source, can convert the received voltage and current, and can supply power to the working coil 12 according to user input. In some implementations, the driving module can be disposed in the casing.

In some implementations, the driving module can be a plurality of chips installed on one printed circuit board. In some implementations, the driving module can be one integrated chip.

The wireless power transmission apparatus 10 can include ferrite 13 that can protect the driving module.

For example, the ferrite 13 can function as a shield that blocks influence of the magnetic field generated by the working coil 12 or an electromagnetic field generated outside of the working coil 12 on the driving module in the wireless power transmission apparatus 10.

To this end, the ferrite 13 can be made of a material with very high permeability. The ferrite 13 can guide the magnetic field introduced into the wireless power transmission apparatus 10 to flow through the ferrite 13 rather than being discharged.

In some implementations, the wireless power transmission apparatus 10 can include at least one working coil 12. In some implementations, the wireless power transmission apparatus 10 can include more than one working coils 12.

The respective working coils 12 can have different sizes, and current of specific frequency can flow in each working coil 12 through inverter-driving under control of the driving module, and thus, in the induction heating mode, target power corresponding to a firepower level selected by a user can be generated and heat corresponding to the target power can be generated.

In the wireless power transmission mode, current of different frequencies can flow through inverter-driving under control of the driving module, and thus, power can be wirelessly transmitted to a small home appliance.

To this end, the respective working coils 12 can be connected to inverters in the driving module, and the plurality of working coils 12 can be connected in parallel or series to each other by a switch and can be connected to an inverter.

When the corresponding wireless power transmission apparatus 10 is operated in the induction heating mode according to user selection, a magnetic field can be generated by current of a predetermined frequency and can be transmitted through a heating container positioned on the upper glass 11.

In some implementations, when an electrical resistance component is included in a material of a cooking container, the magnetic field can generate eddy current in the cooking container. The eddy current can heat the cooking container, and the heat can be conducted and transmitted to an internal side of the cooking container. Thus, the induction heating mode can proceed in a method of cooking contents in the cooking container.

Movement of the magnetic field generated in the working coil 12 by the ferrite 13 is shown in FIG. 2.

With reference to a circuit diagram in which the wireless power transmission apparatus 10 is operated in the induction heating mode, the wireless power transmission apparatus 10 can have a structure shown in FIG. 3.

For example, FIG. 3 is a circuit diagram of a wireless power transmission apparatus in an electromagnetic induction heating mode when the wireless power transmission apparatus includes an inverter 140 and an working coil 12 (hereinafter, referred to as 150). The wireless power transmission apparatus 10 in the electromagnetic induction heating mode can include a rectifier 120, a direct current (DC) link capacitor 130, an inverter 140, the working coil 12 (150), and a resonance capacitor 160.

An external power source 110 can be an alternating current (AC) input power source. The external power source 110 can supply AC power to an electromagnetic induction heating cooking device. For example, the external power source 110 can supply AC voltage to the rectifier 120 of the electromagnetic induction heating cooking device.

The rectifier 120 can be an electrical circuit for converting AC into DC and can convert AC voltage supplied through the external power source 110 into DC voltage. In some implementations, opposite ends of DC output through the rectifier 120 can refer to DC links. A voltage measured at the DC opposite ends can refer to a DC link voltage. When a resonance curve is not changed, output power can be varied depending on a DC link voltage. The DC link capacitor 130 can function as a buffer between the external power source 110 and the inverter 140. For example, the DC link capacitor 130 can maintain the DC link voltage converted through the rectifier 120 and can supply the voltage to the inverter 140.

The inverter 140 can switch a voltage applied to the working coil 12 (150) and can allow high-frequency current to flow in the working coil 12 (150). For example, the inverter 140 can drive a switching device including an insulated gate bipolar transistor (IGBT) and can allow high-frequency current to flow in the working coil 12 (150), and thus, a high-frequency magnetic field can be formed in the working coil 12 (150).

Current may or may not flow in the working coil 12 (150) according to whether the switching device is driven. For example, when current flows in the working coil 12 (150), a magnetic field can be generated. As current flows in the working coil 12 (150), a magnetic field can be generated to heat a cooking container.

As such, in the electromagnetic induction heating mode, the wireless power transmission apparatus 10 can heat the cooking container using the working coil 12 (150) in electromagnetic induction.

When the wireless power transmission apparatus 10 functions in a wireless power transmission mode, the working coil 12 (150) used in inductive heating can be used in wireless power transfer (WPT) in the same way.

Wireless power transfer (WPT) refers to technology of transmitting power without wire. A method used in wireless power transfer (WPT) can include a magnetic induction (MI) method or a magnetic resonance (MR) method. The magnetic induction (MI) method can use a magnetic induction phenomenon between a primary coil and a secondary coil. For example, when current is injected into a primary (transmission) coil, a magnetic field can be generated. Induced current can be generated in the secondary (reception) coil by the magnetic field generated in the primary coil. The induced current generated in the secondary coil can charge a battery. The magnetic field generated using a magnetic induction method may be weak, and thus, the primary coil and the secondary coil need to be positioned adjacent to each other in order to charge the battery.

The magnetic resonance (MR) method is a method in which primary and secondary coils transmit and receive power using the same frequency. For example, when a magnetic field that oscillates at a resonance frequency is generated in the primary coil, the secondary coil can be designed at the same resonance frequency as the magnetic field generated in the primary coil and can receive energy. In some implementations, it can be possible to charge the battery at a relatively long distance.

As such, a corresponding function can be selectively performed according to user mode selection using the same structure by using a coil used in wireless power transfer (WPT) as the working coil 12 used in the induction heating mode.

Referring back to FIG. 3, one side of the working coil 12 (150) can be connected to a node of a switching device of the inverter 140, and the other side of the working coil 12 (150) can be connected to the resonance capacitor 160. The switching device can be driven by a controller 190 (see FIG. 4) and can be controlled according to a switching time output from the controller 190, and as the switching device is alternately operated, a high-frequency voltage can be applied to the working coil 12 (150). An on/off time of the switching device applied from the controller 190 can be controlled to be gradually compensated for, and thus, a voltage applied to the working coil 12 (150) can be changed to a high voltage from a low voltage.

The controller 190 can control an overall operation of the wireless power transmission apparatus 10. For example, the controller 190 can control each component included in the wireless power transmission apparatus 10. The resonance capacitor 160 can be a component that functions as a buffer. The resonance capacitor 160 can adjust a saturation voltage increase rate while the switching device is turned off and can affect energy loss during a turn-off time. The resonance capacitor 160 can include a plurality of capacitors 160a and 160b that are connected in series to each other between the working coil 12 (150) and the DC opposite ends to which a voltage from the rectifier 120 is output. The resonance capacitor 160 can include a first resonance capacitor 160a and a second resonance capacitor 160b. For example, a first end of the first resonance capacitor 160a can be connected to a first end to which a voltage from the rectifier 120 is output, and a second end can be connected to a node of the working coil 12 (150) and the second resonance capacitor 160b. Similarly, a first end of the second resonance capacitor 160b can be connected to the second end to which a low voltage is output from the rectifier 120, and a second end can be connected to the node of the working coil 12 (150) and the first resonance capacitor 160a.

Capacitance of the first resonance capacitor 160a can be the same as capacitance of the second resonance capacitor 160b.

Depending on capacitance of the resonance capacitor 160, a resonance frequency of the wireless power transmission apparatus 10 can be determined.

For example, the resonance frequency of the wireless power transmission apparatus 10 configured as the circuit diagram shown in FIG. 3 can be determined depending on inductance of the working coil 12 (150) and capacitance of the resonance capacitor 160. A resonance curve can be formed based on the resonance frequency determined depending on the inductance of the working coil 12 (150) and the capacitance of the resonance capacitor 160. The resonance curve can represent output power depending on a frequency.

A quality (Q) factor can be determined depending on an inductance value of the working coil 12(150) included in the multi-functional wireless power transmission apparatus 10 and a capacitance value of the resonance capacitor 160. The resonance curve can be differently formed depending on the Q factor. A frequency at which maximum power is output can refer to a resonance frequency (f0), and the wireless power transmission apparatus can use a frequency of a right region based on the resonance frequency (f0) of the resonance curve. Thus, the wireless power transmission apparatus 10 can reduce a frequency to lower a firepower stage and can increase the frequency to increase the firepower stage. The wireless power transmission apparatus 10 can adjust such a frequency and can adjust output power. The wireless power transmission apparatus 10 can use a frequency corresponding to a range to a second frequency from a first frequency. For example, the wireless power transmission apparatus can change a current frequency to any one frequency included in the range to the second frequency from the first frequency and can adjust firepower. The first frequency as a minimum frequency and the second frequency as a maximum frequency that are to be controlled by the wireless power transmission apparatus 10 can be preset. For example, the first frequency can be 20 kHz and the second frequency can be 75 kHz.

As the first frequency is set as 20 kHz, the wireless power transmission apparatus 10 can limit the case in which an audible frequency (about 16 Hz to 20 kHz) is used. Thus, noise of the wireless power transmission apparatus 10 cab be reduced. In some implementations, the second frequency can be set to an IGBT maximum switching frequency. The IGBT maximum switching frequency can refer to a maximum frequency for driving in consideration of internal pressure, capacitance, and the like of the IGBT switching device. For example, the IGBT maximum switching frequency can be 75 kHz.

As such, a frequency that is generally used to heat a cooking took by induction heating in the wireless power transmission apparatus 10 can be between 20 kHz to 75 kHz.

A frequency used in wireless power transfer (WPT) can be different from a frequency used for induction heating the cooking container by the wireless power transmission apparatus 10. For example, the frequency used in wireless power transfer (WPT) can be a frequency with a higher band than a frequency used to heat a cooking container by the wireless power transmission apparatus.

Thus, the wireless power transmission apparatus can provide both a cooking tool heating function and a wireless power transfer (WPT) function through the same working coil 12 (150) by adjusting a resonance frequency.

FIG. 4 is an example of a circuit diagram of the case in which a wireless power transmission apparatus is operated in a wireless power transmission mode.

FIG. 4 shows an example of the wireless power transmission apparatus 10 that selectively provides a cooking container induction heating mode and a wireless power transmission mode.

The wireless power transmission apparatus 10 can include the rectifier 120, the DC link capacitor 130, the inverter 140, the working coil 12 (150), the resonance capacitors 160a and 160b, WPT capacitors 170a and 170b, and mode conversion switches 180a and 180b.

The same description as the description given with reference to FIG. 3 is omitted here.

The working coil 12 (150) can generate a magnetic field as current flows therein. In some implementations, the magnetic field generated in the working coil 12 (150) can heat the target object 1 of a secondary side as being transmitted through the cooking container of the secondary side.

In some implementations, the magnetic field generated by the working coil 12 (150) can transmit power to a small home appliance of the secondary side as being transmitted through the small home appliance of the secondary side.

The resonance capacitors 160a and 160b can be the same as in the description given with reference to FIG. 3. That is, the resonance capacitors 160a and 160b shown in FIG. 4 can be the same as the resonance capacitor included in the wireless power transmission apparatus 10 as described above with reference to FIG. 3.

As the wireless power transmission apparatus 10 is operated in a wireless power transmission mode or a cooking container induction heating mode, the resonance capacitors 160a and 160b may or may not be connected in parallel to the WPT capacitors 170a and 170b.

In some implementations, the WPT capacitors 170a and 170b can be connected in parallel to the resonance capacitors 160a and 160b. The WPT capacitors 170a and 170b can be a component for lowering a resonance frequency of the wireless power transfer (WPT) to operate an electromagnetic induction heating cooking device 100 in the wireless power transmission mode. For example, when the wireless power transmission apparatus 10 is operated in the cooking container induction heating mode, the WPT capacitors 170a and 170b may not be connected to the resonance capacitors 160a and 160b. By way of further example, when the wireless power transmission apparatus 10 is operated in the wireless power transmission mode, the WPT capacitors 170a and 170b can be connected in parallel to the resonance capacitors 160a and 160b. When the WPT capacitors 170a and 170b are connected in parallel to the resonance capacitors 160a and 160b, composite capacitance can increase. When the composite capacitance increases, the resonance frequency (f0) can be reduced according to Equation 1 below.

For example, when the electromagnetic induction heating cooking device 100 is operated in the wireless power transmission mode, the resonance frequency (f0) can be reduced. As such, the wireless power transmission apparatus 10 can reduce the resonance frequency (f0) and can wirelessly transmit power to a product of a secondary side using the original inverter 140 and working coil 12 (150).

The WPT capacitors 170a and 170b can include the first WPT capacitor 170a and the second WPT capacitor 170b. In some implementations, the first WPT capacitor 170a can be connected in parallel to the first resonance capacitor 160a, and the second WPT capacitor 170b can be connected in parallel to the second resonance capacitor 160b.

Capacitance of the first WPT capacitor 170a can be the same as capacitance of the second WPT capacitor 170b.

The mode conversion switches 180a and 180b can determine whether the WPT capacitors 170a and 170b and the resonance capacitors 160a and 160b are connected in parallel to each other. For example, the mode conversion switches 180a and 180b can perform control to connect or not connect the WPT capacitors 170a and 170b in parallel to the resonance capacitors 160a and 160b.

For example, when the mode conversion switches 180a and 180b are turned on, a circuit can be shorted, and the WPT capacitors 170a and 170b and the resonance capacitors 160a and 160b can be connected in parallel to each other. Thus, as described above, the resonance frequency (f0) can be reduced.

In some implementations, when the mode conversion switches 180a and 180b are turned off, the circuit can be open, and the WPT capacitors 170a and 170b may not be connected to the resonance capacitors 160a and 160b. Thus, the resonance frequency (f0) may not be changed.

The mode conversion switches 180a and 180b can include the first mode conversion switch 180a and the second mode conversion switch 180b, and the first mode conversion switch 180a and the second mode conversion switch 180b can be simultaneously operated. The first mode conversion switch 180a can determine whether the first WPT capacitor 170a and the first resonance capacitor 160a are connected in parallel to each other, and the second mode conversion switch 180b can determine whether the second WPT capacitor 170b and the second resonance capacitor 160b are connected in parallel to each other.

In some implementations, the mode conversion switches 180a and 180b can be controlled depending on an operation mode, and can be operated in the wireless power transmission mode or the induction heating mode through the same working coil 12 (150).

For example, one mode of the two modes can be selectively operated through a user input unit according to user selection.

The wireless power transmission apparatus 10 can further include the controller 190 for controlling on and off of the conversion switches 180a and 180b depending on such mode selection, controlling on and off a switching device of the inverter 140, and controlling an overall operation of a driving module.

In some implementations, when the induction heating mode is selected using a user input unit, the controller 190 of the wireless power transmission apparatus 10 can be operated in the induction heating mode, and the conversion switches 180a and 180b can be turned off to perform induction heating.

In some implementations, when the wireless power transmission mode of the target object 1 is selected using the user input unit, the wireless power transmission apparatus 10 can be operated in the wireless power transmission mode, the conversion switches 180a and 180b can be turned on, and wireless power transfer (WPT) can be performed at a resonance frequency based on composite capacitance.

In some implementations, the wireless power transmission apparatus 10 needs to perform whether the target object 1 positioned on the upper glass 11 is capable of wirelessly transmitting power.

Even if a user selects the wireless power transmission mode through the user input unit, when the target object 1 positioned on the wireless power transmission apparatus is an electronic product that is not capable of performing wireless power transfer (WPT) or a small home appliance having no reception coil but not a small home appliance having a reception coil, the wireless power transmission apparatus 10 can differently perform the operation.

When the operation is performed based on only mode selection information received through the user input unit, overcurrent may flow in the target object 1 having no reception coil, or in the case of a foreign object, a waste of electricity may also be caused due to overcurrent and high heat may be accompanied, and thus, the apparatus may be damaged.

Thus, even if selection information of the wireless power transmission mode is received through the user input unit, a procedure of determining whether the target object 1 is for executing the corresponding mode may be required.

Hereinafter, the procedure of determining the target object 1 in a wireless power transmission mode will be described in detail.

Figure 5:
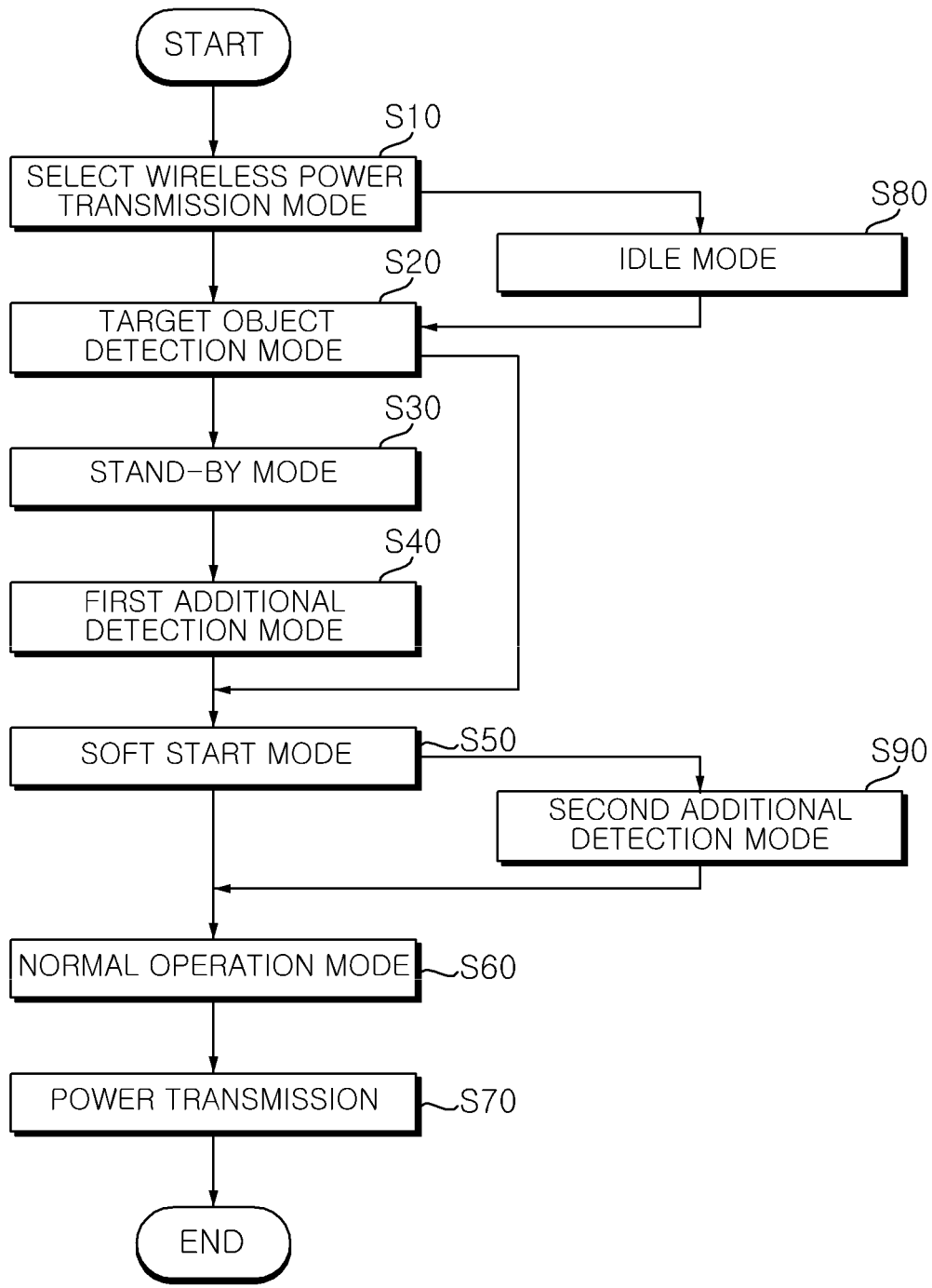
FIG. 5 is a schematic flowchart of a mode of an exemplary wireless power transmission apparatus for induction heating.
Figure 6:
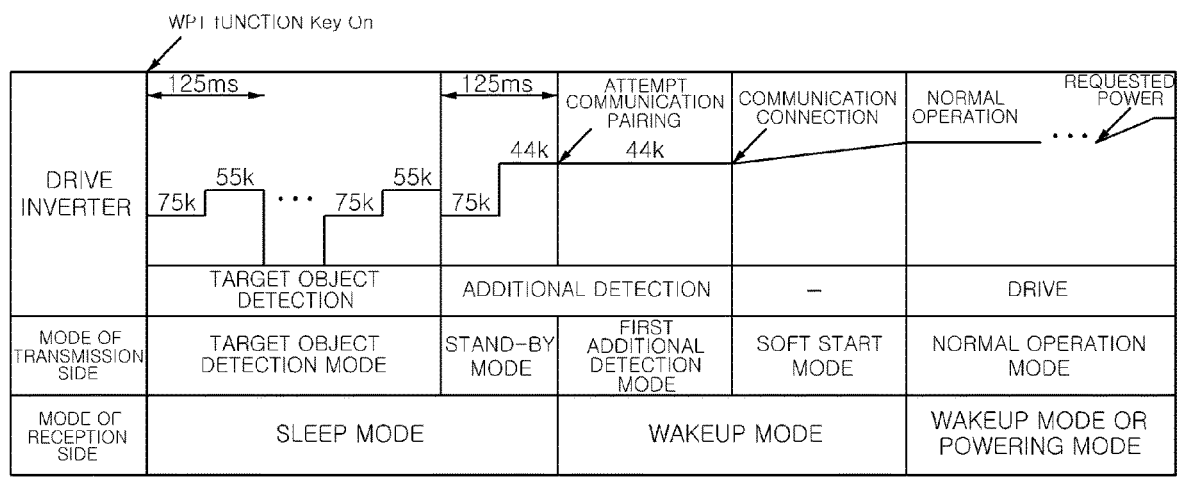
FIG. 6 is a diagram illustrating a structure of a transmission apparatus and a reception apparatus with respect to the flowchart of FIG. 5

FIG. 5 is a schematic flowchart of a mode of a wireless power transmission apparatus for induction heating. FIG. 6 is a diagram showing a structure of a transmission apparatus and a reception apparatus with respect to the flowchart of FIG. 5.

Referring to FIGS. 5 and 6, when the controller 190 receives selection information corresponding to selection of an icon or a button of a wireless power transmission mode by selecting the icon or the button from a user input unit, the wireless power transmission apparatus for induction heating can be converted into the wireless power transmission mode and can perform an operation.

The wireless power transmission apparatus 10 for induction heating can have a preparation period through a plurality of operations to a normal operation mode S60, that is, an operation of wirelessly emitting power towards the reception target object 1.

The wireless power transmission apparatus 10 for induction heating can perform detection for identifying the target object 1 positioned on the upper glass 11 in the preparation period prior to the normal operation mode.

For example, the target object 1 can be identified whether the target object 1 is (i) a small home appliance having a reception coil, (ii) a small home appliance that is directly heated without a reception coil and has only a pick up coil, (iii) a general heating container, (iv) a foreign object, or (v) in a no-load state in which there is nothing.

In some implementations, such identification of the target object 1 can be sequentially performed during preparation to the normal operation mode S60 in the preparation period rather than being simultaneously performed in a single operation.

For example, when receiving mode selection information (S10), the wireless power transmission apparatus 10 can enter a detection mode of the target object 1 in terms of a transmission side.

The wireless power transmission apparatus 10 defined as the transmission side can execute a first additional detection mode S40 and a soft start mode S50 through a target object detection mode S20 and a stand-by mode S30.

In some implementations, the soft start mode S50 and a second additional detection mode S70 can be performed, and prior to entry into the normal operation mode S60, detection of all the target objects 1 can be terminated and corresponding power can be wirelessly transmitted (S70).

The target object detection mode S20 can be simultaneously executed when a user pushes a wireless power transmission mode icon or button of a user input unit, and the controller 190 can oscillate frequencies for determining whether the target object 1 is positioned on the upper glass 11 and predicting an alignment state.

In some implementations, a switching device of the inverter 140 can be alternately turned on and off to allow current to flow according to the oscillation frequency. Whether the target object 1 identified in the target object detection mode S20 is a general heating container can be determined and whether the target object 1 is a heating container can be determined while switching to a first driving frequency from a start frequency.

In the target object detection mode S20, whether the target object 1 is a general cooking container, a small home appliance including a reception coil, a small home appliance including no reception coil, a foreign object, or no load can be determined.

In the target object detection mode S20, the wireless power transmission apparatus 10 can attempt wireless communication with the target object 1, and reception through wireless communication can be started by communication pairing when power of a small home appliance that is the target object 1 is supplied in the first additional detection mode.

An idle mode S80 can be defined as a start mode in which the controller 190 is activated by supplying power to a driving module including the controller 190 of the wireless power transmission apparatus 10 for induction heating when a user pushes and turns on a power button through a user input unit.

In the idle mode, wired communication between the user input unit and the driving module can be performed.

The stand-by mode S30 can be an operation after the target object detection mode S20, and can be defined as a frequency change period in which the inverter 140 is driven at a second operation frequency in order to determine a foreign object when the target object 1 is present in a region for wireless power transfer.

In some implementations, in the stand-by mode S30, frequency sweep can occur from an initial operation frequency to a second operation frequency, and when the second operation frequency is reached, a current mode can substantially enter the first additional detection mode S40.

In some implementations, the second operation frequency may not oscillate from the beginning because oscillation needs to be sequentially induced since driving noise is generated when the apparatus is driven at the second operation frequency, that is, a lower frequency than the initial operation frequency in a state in which a voltage of a DC link is charged.

The first additional detection mode S40 can be defined as a period in which induced voltage information of the target object is received and whether a foreign object is present in a state in which the apparatus is driven at the second operation frequency and communication pairing with a reception side, that is, the target object 1 is performed.

In some implementations, when the foreign object is determined to be present, the apparatus can enter the idle mode again and information indicating that the foreign object is present can be signaled to a user, and when there is no foreign object, the apparatus can enter the soft start mode S50.

For example, a state that is activated by injecting power into the reception side, that is, the target object 1 due to induced current from the first additional detection mode S40 can be defined as a wakeup mode, and in this case, wireless communication can be paired between the reception side and the transmission side and communication can begin therebetween.

The soft start mode S50 can be defined as a period in which power requested by the target object 1 is changed to a frequency corresponding to corresponding power for an operation in the wireless power transmission apparatus 10.

When the power requested by the target object 1 is approximately reached in the soft start mode S50, a current mode can enter the normal operation mode S60.

In the soft start mode S50, the second additional detection mode S90 can also be executed.

The second additional detection mode S90 can be defined as a period in which additional detection is performed for recheck when the target object 1 is determined to be a small home appliance having no reception coil.

For example, in the second additional detection mode S90, a mode that is actually selected by a user can be rechecked, and whether there is an error of judgment between no load and a small home appliance with no reception coil can be rechecked.

The normal operation mode S60 can be defined as a period in which change in requested output is monitored and whether there is a difference between actual output and the requested output is determined with a constant level at power of the level requested by the target object 1.

In some implementations, when there is the difference between the actual output and the requested output, if the actual output is lower than the requested output, a power up mode can proceed to lower an operation frequency and to increase output, and if the actual output is higher than the requested output, a power down mode can proceed to increase the operation frequency and to lower the output.

At a side of the target object 1, according to user operation selection and operation time of the target object 1 or according to request for low power or high power, the controller 190 can perform an operation using requested output based on the request.

Prior to the normal operation mode while the aforementioned modes are sequentially or inversely performed, the state of the target object 1 can be preferentially determined in the preparation period.

Thus, even if a wireless power transmission mode is selected, when it is not possible to drive the positioned target object 1 through wireless power transfer, an idle mode can be executed, thereby protecting the apparatus and limiting power wasting due to overcurrent.

Hereinafter, an exemplary process after a target object detection mode will be described in detail with reference to FIGS. 7 to 9.

Figure 7:
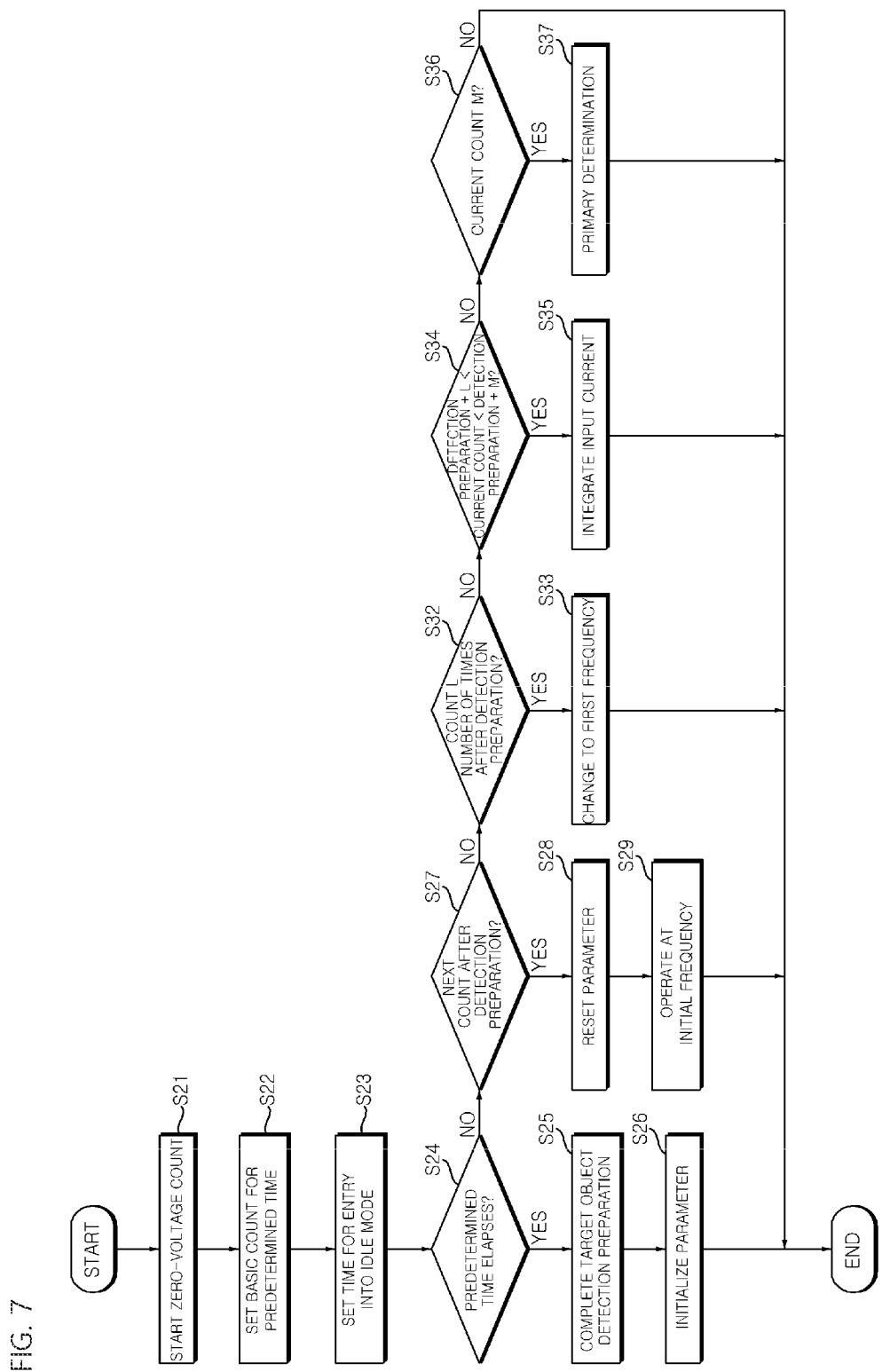
FIG. 7 is a schematic flowchart in a wireless power transmission mode of an exemplary wireless power transmission apparatus for induction heating.

FIG. 7 is a schematic flowchart in a wireless power transmission mode of a wireless power transmission apparatus for induction heating. FIG. 8 is a detailed flowchart illustrating an exemplary process after primary determination of FIG. 7. FIG. 9 is a flowchart illustrating an exemplary process for compensation of primary determination of FIG. 8.

Referring to FIG. 7, the wireless power transmission apparatus 10 for induction heating can change a frequency to a first driving frequency from a start frequency in a target object detection mode, and can classify the target object 1 at a first driving frequency into a general heating container, a small home appliance having no reception coil, and a first group that is the remaining group.

The first group can be defined as a group including a small home appliance having a reception coil, a foreign object, and no load (which means that no object is positioned on the upper glass 11).

In some implementations, the start frequency can be a set basic frequency. For example, the start frequency can be about 75 kHz.

As shown in FIG. 7, zero-voltage count can be started with respect to a switching signal provided to a switching device of the inverter 140 (S21).

In some implementations, the zero-voltage count can be defined as performing detection at a time at which a rectified reference voltage applied at 120 Hz is 0 V after commercially available power that is reference power of the wireless power transmission apparatus 10 for induction heating is full-wave rectified with respect to a reference voltage of 60 Hz.

As such, detection or count can be performed when the reference voltage is 0, and thus, an output value for minimizing influence of an input reference voltage can be calculated.

In some implementations, the input reference voltage can be commercially available power, and thus, a description will be given based on 120 Hz that is a frequency of the rectified voltage. In some implementations, the frequency of the rectified voltage may not be 120 HZ, and it would be understood that detection or count can be performed when the reference voltage is 0.

In some implementations, count can be configured to be performed at 120 Hz, that is, every 8.33 ms. In some implementations, the count can be configured to be performed at a frequency other than 120 HZ.

When the foreign object detection mode begins, the controller 190 can perform zero-voltage count to find an accurate zero-voltage time from a start time of a detection mode of the target object 1, that is, a time point of receiving a mode selection signal from a user input unit.

The controller 190 can start zero-voltage count for a predetermined time and can enhance the accuracy of zero-voltage count to reduce error (S22). In some implementations, the predetermined time can be at least one second and can be set to a time that is not greater than 3 seconds.

When there is no counted value for a reference time, the controller 190 can set a reference time of entry into an idle mode (S23).

The reference time can be set to 3 seconds as a maximum value for the predetermined time.

The controller 190 can perform count of reading input current at each zero-voltage time.

In some implementations, the input current can refer to current flowing in a switching device of the inverter 140, and a group to which the target object 1 belongs can be determined by reading corresponding input current and integrating the input current in predetermined counts.

For example, when zero-voltage count is performed, all counts can be performed for a predetermined time, e.g., 1 second, and 1 second elapses (S24), detection preparation of the target object 1 can be determined to be completed (S25) and all parameters can be initialized (S26). In some implementations, the parameter can be reset and initialized, for example, blank processing of a timer and flag value.

As such, when a predetermined time elapses, preparation can be determined to be completed and a next count can be performed.

The controller 190 can perform zero-voltage count in a next period when a predetermined time elapses, that is, can perform count at 1 second+8.33 ms (S27).

In some implementations, each parameter can be reset (S28), and a frequency of a switching signal applied to the inverter 140 can be set to an initial frequency and a switching device of the inverter 140 can be driven (S29).

For example, when the initial frequency is 75 kHz, the frequency of the switching signal can be set to 75 kHz. In some implementations, only counting can be performed and detection of input current may not be performed in zero-voltage count.

When a switching device of the inverter 140 begins to be driven at an initial frequency, such driving at the initial frequency can be continuously performed for a predetermined time.

The predetermined time can be arbitrarily set but the driving at the initial frequency can be maintained up to change to a next operation frequency. For example, the switching device of the inverter 140 can be driven at the initial frequency until a first count is performed after 1 second that is a detection preparation time.

A capacitor 130 can be charged while only zero-voltage count is performed without detection of input current.

When a first count is performed after 1 second that is a detection preparation time through zero-voltage count (S32), the controller 190 can change a switching signal of the inverter 140 to satisfy the first driving frequency and can allow resonance current of the first driving frequency to flow (S33).

In some implementations, the first driving frequency can be used to determine whether a foreign object is present, can be a threshold frequency at which overcurrent is not exerted, and can be, for example, 55 kHz.

However, the first driving frequency is a lower frequency than the initial frequency, and can be a higher frequency than a second driving frequency at which wireless power transfer is performed.

When a frequency of resonance current is changed to the first driving frequency, the controller 190 can detect input current flowing in the inverter 140 in each count until a current count is between a first count after 1 second that is an initial preparation time and $m^{th}$ count after 1 second that is an initial preparation time (S34).

In some implementations, the controller 190 can integrate input current detected in respective counts (S35).

For example, the integrated input current can be input current corresponding to $(m-1)^{th}$.

For example, when $l^{th}$ satisfies $8^{th}$ and $m^{th}$ satisfies $15^{th}$, the controller 190 can read input current flowing in the inverter 140 to a $14^{th}$ count from a $9^{th}$ count and can perform integration thereon.

When a current count is an $m^{th}$ count after 1 second that is a foreign object detection preparation period, the controller 190 can terminate count (S36), can re-change a frequency of the resonance current to an initial frequency, and can perform primary determination on the target object 1 based on the integrated value (S37).

The target object detection mode including primary determination can include an $m^{th}$ count, and when m is 15, about 125 ms can be taken. In some implementations, different time can be taken when m is 15.

Such a target object detection mode can be repeatedly performed over a plurality of number of times, but a number of times and a time may not be specified.

The controller 190 can perform primary determination on the target object 1 based on input current values integrated up to an $m^{th}$ count, and the primary determination will be described with reference to FIG. 8.

Figure 8:
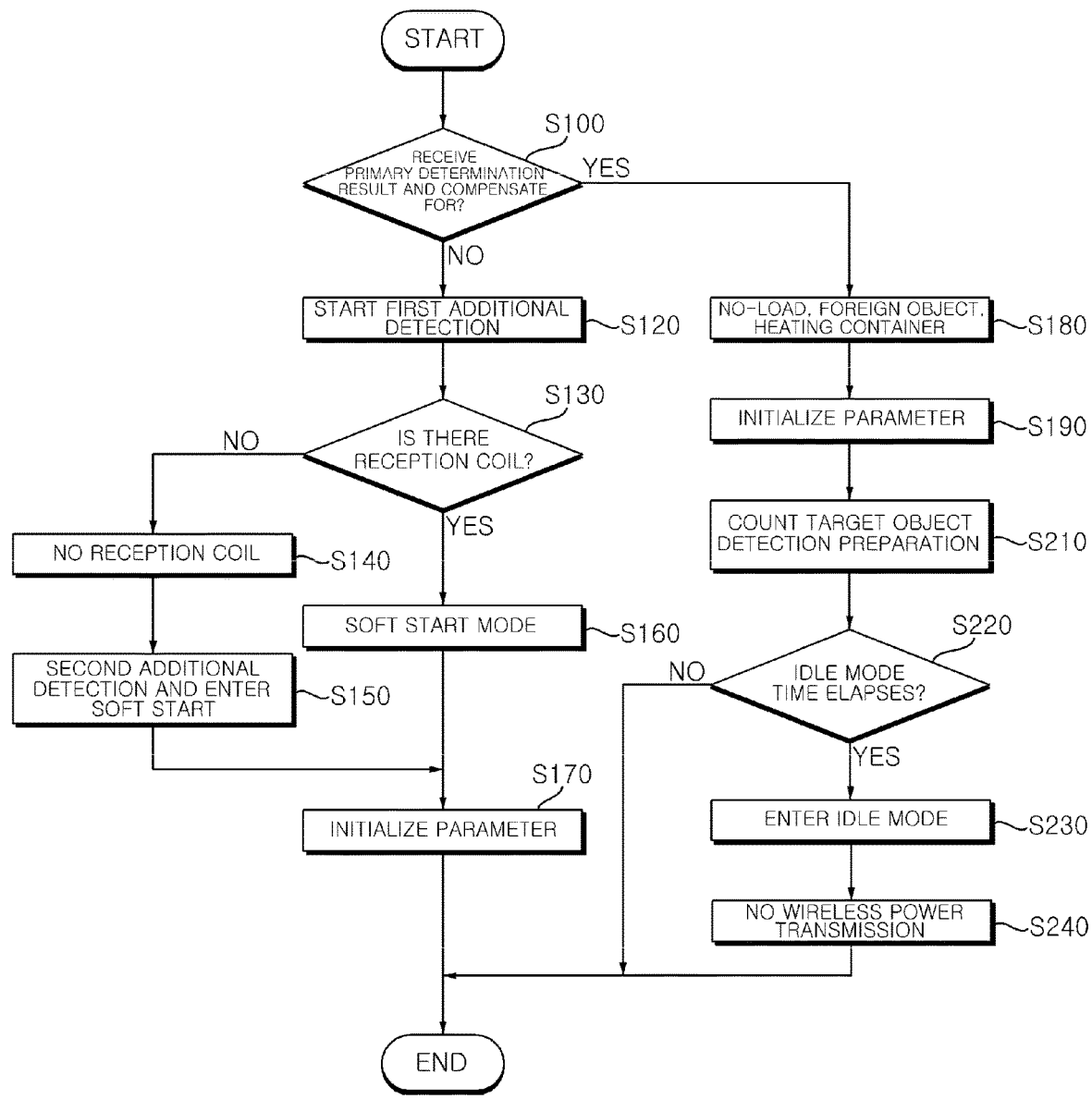
FIG. 8 is a detailed flowchart illustrating an exemplary process after primary determination of FIG. 7.

Referring to FIG. 8, when an $m^{th}$ count is performed, the controller 190 can receive an integrated value of input current detected a plurality of number of times, that is, (m−1) number of times as a primary determination result (S100).

In some implementations, the primary determination result can be received, this can be compensated for, and whether the target object is a small home appliance including a reception coil, an object having no reception coil, or the remaining can be determined.

The remaining can be no load, a foreign object, or a heating container.

In some implementations, an integrate value of input current of (m−1) number of times as the primary determination result will be referred to as an integrated value of input current.

The controller 190 can determine any one group to which the target object 1 belongs among the three groups based on the integrated value of input current.

In some implementations, the controller 190 can appropriately compensate for the integrated value of input current and can calculate the compensated integrated value of input current, thereby enhancing the accuracy of determination.

Hereinafter, a method of identifying the target object 1 based on a compensated integrated value of input current will be described with reference to FIG. 9.

Figure 9:
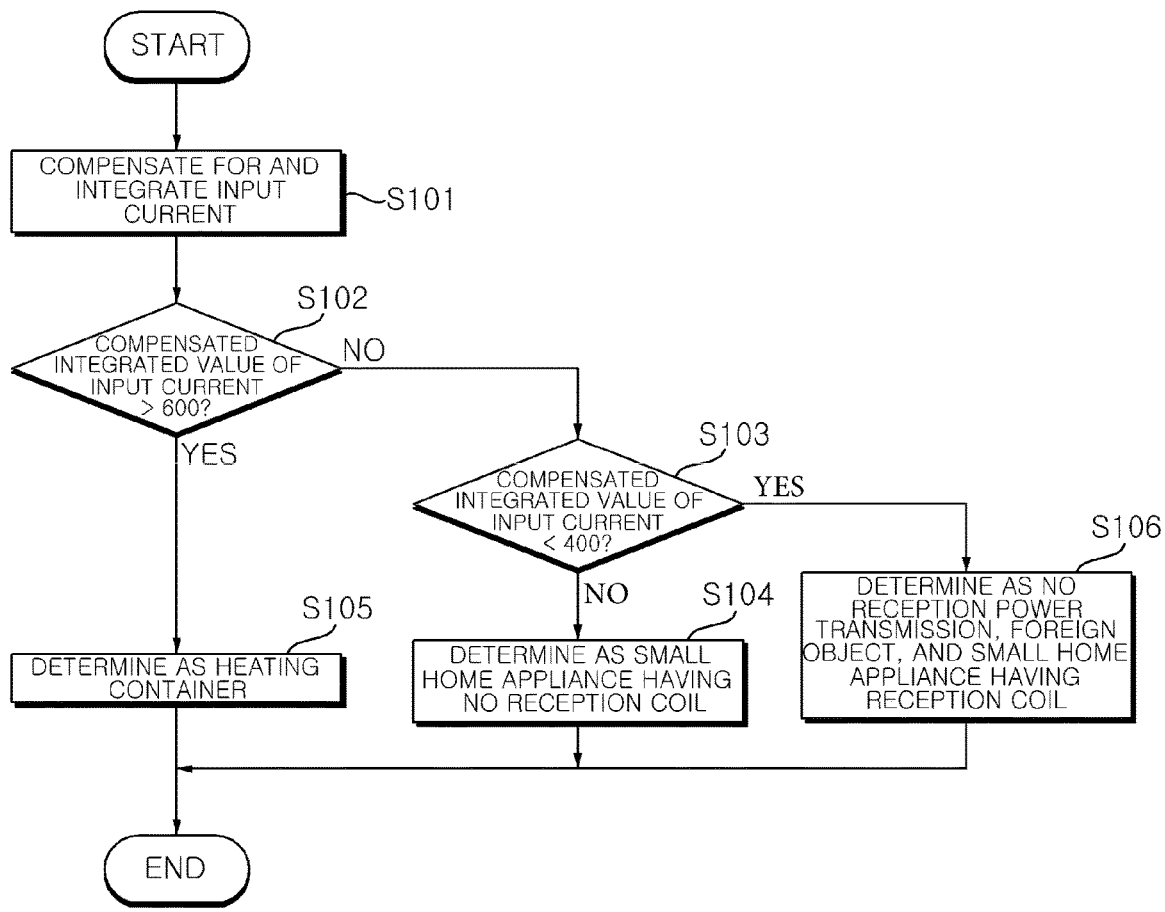
FIG. 9 is a flowchart illustrating an exemplary process for compensation of primary determination of FIG. 8.

Referring to FIG. 9, the controller 190 can receive the aforementioned integrated value of input current and can start analysis based on the received integrated value of input current.

In some implementations, a predetermined difference in an integrated value of input current can be generated depending on an input voltage value of supplied commercially available power, that is, reference power, and in order to compensate for this, a compensated value of input current can be calculated by applying the following compensation equation (S101).

Compensated integrated value of current input=integrated value of input current+{(253−input voltage)/k}+p       [Equation 1]

The compensation equation can be selected based on data in a no-load state when input voltage is 253 V. In some implementations, k and p can be a predetermined integer.

For example, k can be 4 and p can be 1. In some implementations, different values can be assigned to k and p.

The compensation equation can be derived from Table 1 below.

TABLE 1

| Input Voltage | | V187 | | V220 | | V253 | |
|---|---|---|---|---|---|---|---|
| Parameter | | I_input | I_55k | I_input | I_55k | I_input | I_55k |
| WPT | None | 359 | 407 | 366 | 427 | 376 | 454 |
| All-Clad | 8 inches | 750 | 444 | 858 | 464 | 970 | 487 |
| Minimum heating container (145 mm) | | 683 | 401 | 782 | 420 | 888 | 445 |
| Test piece (Iron Bar) | | 362 | 358 | 374 | 368 | 387 | 375 |
| Rice cooker with RX_Side Coil | 8T/Constancy | 469 | 453 | 513 | 457 | 555 | 476 |
| | 8T/eccentricity | 431 | 405 | 466 | 418 | 502 | 434 |
| | 11T/Constancy | 430 | 417 | 465 | 430 | 500 | 450 |
| | 11T/eccentricity | 408 | 395 | 437 | 406 | 468 | 421 |
| | 14T/Constancy | 408 | 406 | 437 | 418 | 466 | 434 |
| | 14T/eccentricity | 392 | 387 | 416 | 400 | 442 | 411 |
| Electric kettle | Constancy | 438 | 368 | 480 | 373 | 522 | 384 |
| | eccentricity | 415 | 351 | 445 | 357 | 479 | 363 |
| Wireless Toaster | Constancy | 355 | 305 | 361 | 304 | 368 | 308 |
| | eccentricity | 362 | 400 | 370 | 417 | 380 | 442 |
| Wireless Blender | Constancy | 355 | 320 | 362 | 321 | 369 | 329 |
| | eccentricity | 360 | 387 | 368 | 404 | 377 | 424 |

As shown in Table 1 above, integrated values of input current of (m−1) number of times depending on input voltage on various target objects 1 are shown in I_input, and I_55 k shows the sum of resonance current flowing in the working coil 12 at a first operation frequency of 55 kHz.

WPT can indicate no-load, a minimum heating container can be a general heating container, and a test piece can be an iron bar as an example of a foreign object.

In some implementations, constancy and eccentricity can indicate alignment states between the working coil 12 and the reception coil when the target object 1 has a reception coil.

As depicted in Table 1, an integrated value I_input of input current can be greater than an integrated value I_55 k of resonance current by a variation, and thus, it can be advantageous when the target object 1 is identified based on the integrated value I_input of the input current based on a difference in the target object 1.

In some implementations, when the input voltage is not 253 V, for example, when the input voltage is 287 V or 220 V, the corresponding compensation equation can be applied and the target objects 1 can be compared, and when input voltage is smaller than 253 V, the variation in the integrated values of input current can also be increased to clearly identify the target object 1.

Based on the compensated integrated value of input current, when the corresponding integrated value is greater than a first value (S102), the target object 1 can be determined to be a heating container (S105).

When the corresponding integrated value is equal to or less than a first value and is equal to or greater than a second value (S103), the target object 1 can be preferentially determined to be a small home appliance having no reception coil (S104).

When the corresponding integrated value is less than the second value, the target object 1 can be determined to belong to a first group that is the remaining group, that is, a group corresponding to any one of no-load, a foreign object, and a small home appliance having a reception coil (S106).

Thus, when the target object 1 belongs to the remaining first group, the target object 1 needs to be additionally determined among the three.

Compensation can be performed irrespective of an input voltage using the compensated integrated value of input current, and thus, a difference between groups may be widened to clearly identify the corresponding target object 1 based on a boundary of the first or second value.

In some implementations, the first value can be a value between 550 to 650. For example, the first value can be 600.

In some implementations, the second value can be a value between 350 to 450. For example, the second value can be 400.

As described above, in a target object detection mode executed in a preparation period prior to a normal operation mode, a heating container can be obviously identified via comparison in the compensated integrated value of input current.

Based on the determination of FIG. 9, as depicted in FIG. 8, when the target object is determined as a heating container (S180), a parameter can be initialized (S190), and a predetermined time for an idle mode executed in a detection preparation operation of the target object can be counted again (S210).

For example, when zero-voltage count is started again and a predetermined time for the idle mode elapses (S220), a current mode can enter the idle mode (S230), and it can be determined that wireless power transfer is not present and an operation can be determined (S240).

Like in the case of the heating container in FIG. 8, an operation can also be performed in the same way on the remaining bound target objects (no-load or foreign object), and this will be described below.

Referring to FIG. 8, as a foreign object detection mode is terminated in a preparation period prior to a normal operation mode, the controller 190 can enter a stand-by mode, can change a frequency of resonance current to a second operation frequency, and can start first additional detection (S120).

In some implementations, the inverter 140 can prepare for an operation at the second operation frequency, and the second operation frequency can be an operation frequency for a first additional detection mode for determining whether a foreign object is present.

The second operation frequency can be an operation frequency for receiving information on induction voltage generated from induction current flowing in a reception coil of the corresponding target object 1 when the target device 1 has a reception coil.

For example, the second operation frequency can be 44 kHz.

Hereinafter, with reference to FIG. 10, an operation in the first additional detection mode (S120) will be described.

Figure 10:
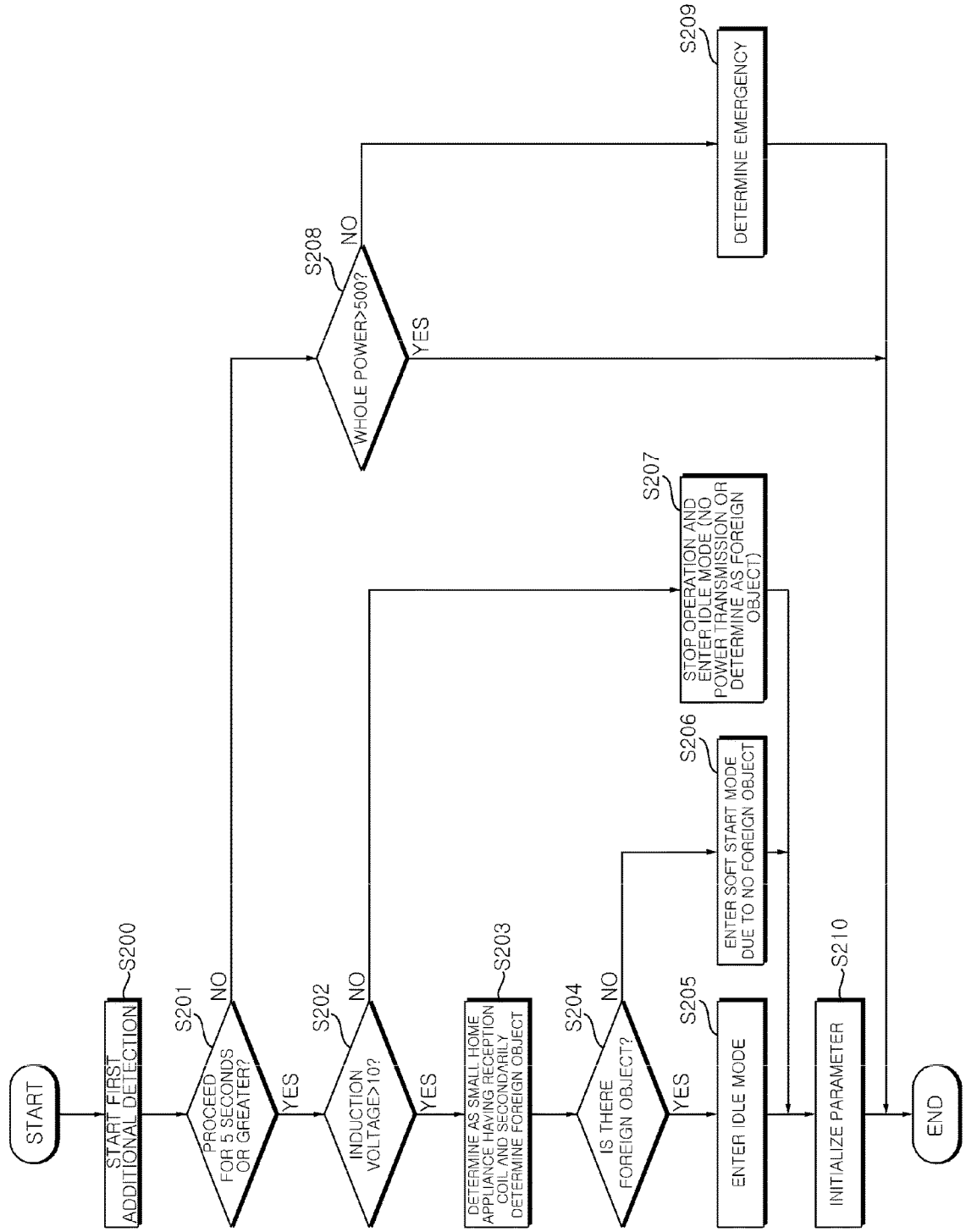
FIG. 10 is a flowchart illustrating an operation in a first additional detection mode of FIG. 5.

Referring to FIG. 10, when the first additional detection mode begins (S200), the controller 190 can determine to which the target object 1 belongs from the remaining group that is not identified based on the compensated integrated value of input current, that is, a small home appliance including a reception coil, a foreign object, and no-load.

When identifying the target object 1, the controller 190 can drive the inverter 140 using resonance current at the second operation frequency, can receive induction voltage information from the target object 1, and can identify the target object 1 based on the received induction voltage information.

For example, as shown in FIG. 10, the controller 190 can perform zero-voltage count and can wirelessly transmit power for a predetermined time while driving the inverter 140 at the second driving frequency (S201).

In some implementations, the predetermined time needs to be a time sufficient to drive the inverter 140 and to apply an induction voltage to the target object 1. For example, the time can be 5 seconds.

As such, when zero-voltage count is performed for a predetermined time or greater while driving the inverter 140 using resonance current at the second driving frequency, the controller 190 can perform wireless communication with the target object 1 while performing communication pairing in a corresponding mode.

In some implementations, the wireless communication can be performed through a general communication method such as ZIGBEE, WIFI, or BLUETOOTH.

The controller 190 can receive information regarding an induction voltage induced in a reception coil from the target object 1 through a communicator.

In some implementations, when the amplitude of the induction voltage is equal to or greater than a first threshold value or greater (S202), the target object 1 can be determined to be a small home appliance having a reception coil (S203).

When the target object 1 is determined to be the small home appliance having a reception coil, whether a foreign object is present can be determined, which is an original purpose of a current mode (S204).

For example, even if the target object 1 is determined to be the small home appliance having a reception coil, whether a foreign object other than the corresponding target object 1 is present together may be determined.

In some implementations, when whether a foreign object is present is determined and the foreign object is determined to be present, driving of the inverter 140 can be terminated and a current mode can enter the idle mode (S205).

When only the small home appliance having a reception coil is determined to be present without a foreign object, a current mode can enter a soft start mode and a normal operation can be prepared (S206).

When an induction voltage is equal to or less than the first threshold value, it can deem that there is no information regarding the induction voltage, it can be determined that a small home appliance malfunctions, there is no load, or a foreign object is present, an operation can be terminated, and the current mode can enter the idle mode (S207).

In some implementations, when zero-voltage count is performed for a predetermined time or greater, if the target object 1 is a foreign object, for example, an iron bar such as a chopstick that is commonly used in a kitchen and the apparatus is driven for 5 seconds or greater at the second driving frequency, a temperature can be remarkably increased, and thus, it is required that the apparatus is not driven for 5 seconds or greater.

Thus, in the first additional detection mode, the target object can be determined to be the small home appliance having a reception coil among the remaining cases, the current mode can enter a soft start mode, and in the other mode or in the case of the small home appliance having a reception coil, when a foreign object is present, an operation can be terminated and the current mode can enter the idle mode.

When performing zero-voltage count, the controller 190 can periodically read output power of the working coil 150 within a predetermined time (S208).

In this regard, a user can suddenly position a heating container or the like on the upper glass 11 within a predetermined time, and thus, when the heating container is positioned on the upper glass 11 while the inverter 140 is driven at a second resonance frequency, very high power can be suddenly consumed.

Thus, when such high power is detected in the working coil 150, an emergency can be determined to occur, an operation can be stopped, and the current mode can enter an idle mode (S209).

In some implementations, comparison of output power can be determined based on a second threshold value, and the second threshold value can be set to 500 W or greater.

In the case of the wireless power transmission apparatus 10 for induction heating used in a kitchen, when a fuel mouth is 6 inches in driving at a second driving frequency, that is, 44 kHz, it can be recommended that a general heating container used in induction heating have a diameter of 145 mm or greater.

When a heating container with such a condition is suddenly positioned on the upper glass 11 in this operation, output of 1000 W or greater can be generated. Thus, in this operation, when the second threshold value is 500 W, it can be immediately determined that the heating container is positioned on the upper glass 11.

As such, the operation can be performed as shown in FIG. 10, and thus, whether the target object 1 is a small home appliance having a reception coil can also be determined through induction voltage information from the target object 1 in the first additional detection mode in FIG. 8 with respect to the remaining target object in the target object detection mode (S130), and the current mode can enter the idle mode of stopping wireless power transfer with respect to the remaining cases (foreign object or no-load) (S230), and thus, even if the user selects an icon of the wireless power transmission mode by mistake, the operation can be safely performed.

Thus, when the user selects the wireless power transmission mode, if the target object 1 is the small home appliance having a reception coil, the current mode can enter the soft start mode, desired power information can be received through communication with the small home appliance having a reception coil, which is the target object 1, and a resonance frequency can be switched to a frequency corresponding target power.

In the case of transition to a resonance frequency close to the target power, power of the target power can be wirelessly transmitted to the target object 1 in the normal operation mode.

As shown in FIG. 8, when the target object 1 is a small home appliance having no reception coil (S140), that is, when an integrated value of input current compensated for in the target object detection mode is determined to be between first and second values and the target object 1 is determined to be the small home appliance having no reception coil, whether the small home appliance is actually present can be rechecked using a second additional detection period and then the current mode may enter the soft start mode (S150).

Hereinafter, a second additional detection mode after a target object is determined to be a small home appliance having no reception coil and a current mode enters a soft start mode will be described with reference to FIG. 11.

Figure 11:
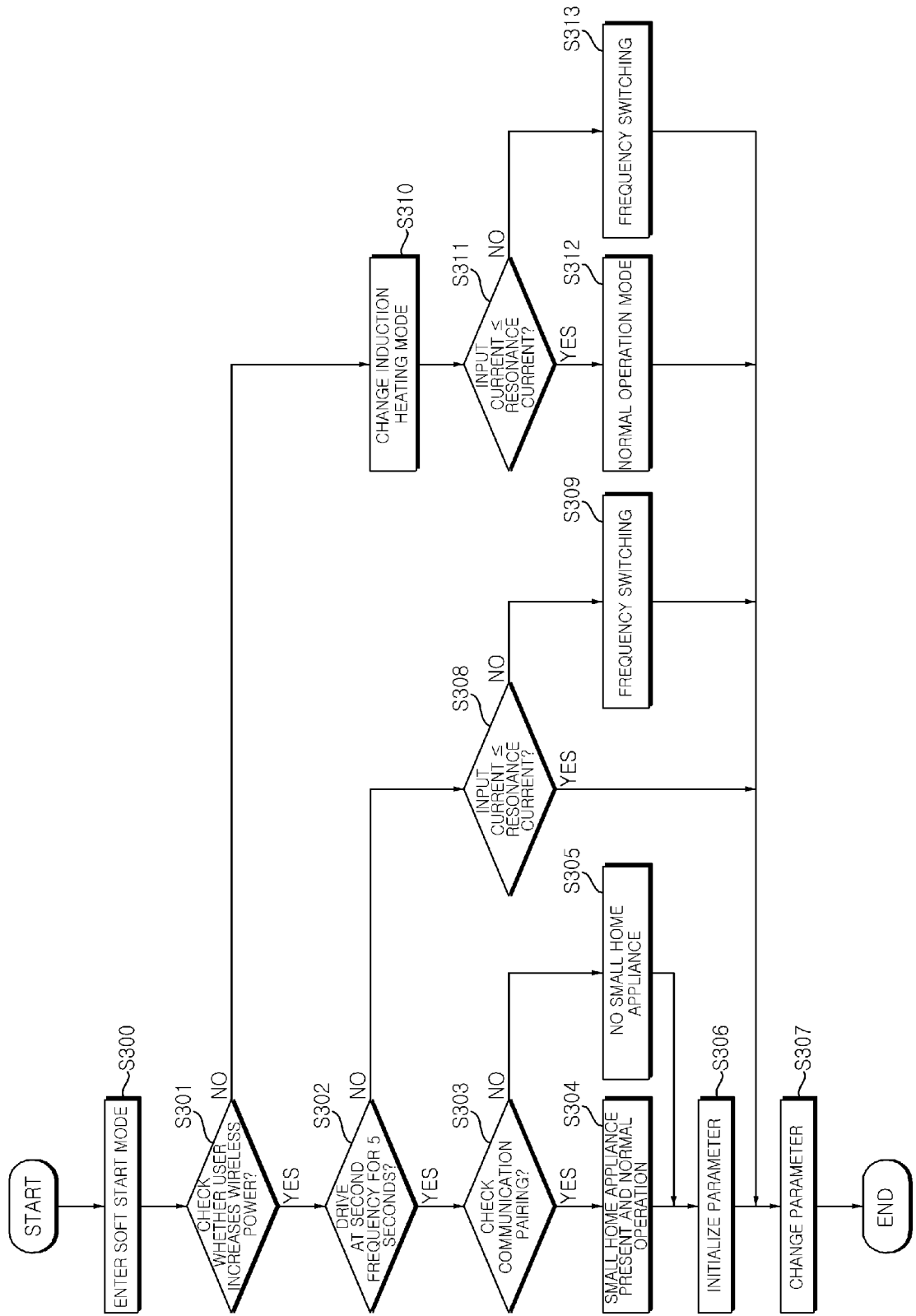
FIG. 11 is a flowchart illustrating an operation in a second additional detection mode of FIG. 5.

Referring to FIG. 11, when determining that the target object is the small home appliance having no reception coil, the controller 190 can enter the soft start mode and can start frequency transition to reach desired target output in a state in which communication with the small home appliance having no reception coil, which is the target object 1, is connected (S300).

In some implementations, the target object 1, that is, a reception side can be in a wakeup mode in which communication pairing is connected, and can make a request to a small home appliance of the reception side for required information and can receive the information.

The controller 190 can perform a procedure of rechecking whether a mode selected by a user from a user input unit is a wireless power transmission mode (S301).

In such a check procedure, the controller 190 can visually or audibly provide an alarm to a user through a user interface or the like and can guide the user to recheck of the mode selected by the user.

In addition or alternatively, the controller 190 can re-read selection information that is initially selected by the user and can recheck the selection information.

In some implementations, when the user determines to select an induction heating mode instead of selection of a wireless power transmission mode, the controller 190 can switch the entire mode to the induction heating mode to perform induction heating (S310).

In some implementations, the controller 190 can visually or audibly notify the user of the corresponding mode switch and can guide forced termination from the user.

When the induction heating mode is executed, the controller 190 can compare input current that currently flows in the inverter 140 with the amplitude of resonance current (S311), and when the input current is equal to or less than the resonance current after a predetermined time elapses, the soft start mode can be terminated and the current mode can enter the normal operation mode to achieve target output (S312).

As such, when the induction heating mode is executed, the target object 1 can be directly heated while a frequency is set to allow the input current equal to or less than the resonance current to flow.

In some implementations, when the input current is greater than the resonance current, the driving frequency can be switched and reduction in the input current can be guided compared with the resonance current (S313).

When the mode selected by the user is rechecked as a wireless power transmission mode, the controller 190 can perform communication pairing while driving the inverter 140 at the second operation frequency for a predetermined time.

In some implementations, as shown in FIG. 11, after a predetermined time, for example, 5 seconds elapse, when communication pairing is checked and induction voltage information is received from the small home appliance (S303), whether the amplitude of the corresponding induction voltage is greater than a third threshold value can be determined.

When the amplitude of the induction voltage is greater than the third threshold value, the target object 1 can be determined to be the small home appliance having no reception coil, that is, a home appliance that has no reception coil but has a pick up coil to wirelessly receive power, and the current mode can enter a normal operation mode for performing a normal operation (S304).

In some implementations, when communication pairing is not performed and information on induction voltage is not received, it can be determined that there is no small home appliance, the wireless power transmission mode can be terminated, and the current mode can enter the idle mode (S305).

As such, the possibility of misjudgment that occurs in determining the target object 1 that is identified based on the integrated value of input current can be rechecked based on whether communication pairing is performed, and thus, the target object 1 can be obviously determined to be the small home appliance having no reception coil.

The input current of the working coil 150 can be periodically read during preparation of wireless power transfer via second frequency driving within a predetermined time (S308), and frequency switching can be performed in such a way that the input current satisfy resonance current or less (S309).

As such, a determination value of the small home appliance having no reception coil, which is determined only the integrated value of input current, can be re-checked using the second additional detection mode in the soft start mode, and selection information of the user can be re-checked, thereby enhancing the accuracy of determination.

Referring back to FIGS. 11 and 8, when the normal operation mode is executed, all parameters can be initialized (S306 and S170), and power depending on corresponding target output can be transmitted while a frequency is changed (S307).

As such, the current mode can enter the normal operation mode, wireless power transfer can be performed only on the small home appliance having a reception coil or the small home appliance having no reception coil but may not be performed on no-load, a foreign object, or a general heating container, and the current mode can enter the idle mode and the operation can be stopped.

Thus, while an operation is performed in a predetermined mode in a power transfer preparation period prior to the normal operation mode, the characteristic of the target object 1 can be determined a plurality of numbers of times, the corresponding target object 1 can be classified, and thus, an operation can be performed in an appropriate mode for each target object 1.

Through the above solution, the multi-functional wireless power transmission device using one working coil can selectively drive a wireless power transmission mode or an induction heating mode, can switch a mode depending on a load state of a target object, that is, whether a small home appliance has a coil, in the wireless power transmission mode, and can perform an optimized mode.

Thus, when the user selects an induction heating mode or a wireless power transmission mode, a frequency can be adjusted depending on the selected mode and an operation can be performed in the induction heating mode or the wireless power transmission mode, and an operation can be performed at the optimized frequency depending on whether there is a load in the determined target object, thereby preventing the apparatus from malfunctioning or being damaged due to overcurrent or overpower supplied to the target object.

When the mode selected by the user is a wireless power transmission mode, whether a target small home appliance is an electronic device that is capable of performing wireless power transfer can be additionally determined, and when the target small home appliance is not the electronic device that is capable of performing wireless power transfer, the current mode can be switched to an appropriate mode, thereby correcting user error.

As such, when a wireless power transmission mode is selected, whether the target object is (i) a small home appliance having a reception coil, (ii) a small home appliance having no reception coil, (iii) a general cooking container for induction heating, (iv) in a no-load state in which there is nothing, or (v) in a state in which a foreign object is positioned can be determined, and the operation can be performed in a mode appropriate for each case.

In addition, it can be possible to determine a corresponding load state without a separate sensor or a detection circuit, thus (i) cost can be reduced, (ii) the size of the apparatus can be minimized, (iii) compensation can be performed using a determination factor, and (iv) load determination can be performed to switch the current mode to the optimized mode.

The present disclosure provides a wireless power transmission apparatus that performs load determination prior to normal power transfer and safely performs the operation by executing the foreign object detection mode again prior to normal power transfer and determining whether the user suddenly position a cooking container or whether a foreign object is present even if it is determined that there is a reception coil In addition, even if it is determined that there is no reception coil, the operation may not be immediately performed, whether a current state corresponds to a small home appliance having no reception coil, a no-load state, or a general heating container can be determined through communication fairing while a frequency is sequentially switched using a soft start mode, and the current can be switched to an appropriate driving mode.

What is claimed is:

1. A wireless power transmission apparatus for induction heating comprising:
    a working coil that is configured to change operation based on selection of a mode of operation from among a plurality of operating modes, the plurality of operating modes including a wireless power transmission mode configured to wirelessly transmit power and a heating mode configured to heat one or more objects;
    an inverter that is configured to output, to the working coil, current at an operation frequency; and
    a controller configured to:
        detect a target object, and
        determine, in the wireless power transmission mode, whether the target object is (i) a device from among a first group of devices including a device with a reception coil or (ii) an induction heating device, wherein the controller is configured to, in the wireless power transmission mode, operate in a preparation period prior to a normal wireless power transmission mode configured to perform wireless power transmission to the target object, wherein the determination of whether the target object is a device from among a first group of devices occurs in the preparation period, wherein the controller is configured to:
- read, in a target object detection mode, input current applied to the inverter, perform integration on the input current, and
- determine the target object based on an integrated value of the input current, wherein the controller is configured to count the input current at a zero voltage point of a main power supply, wherein the controller is configured to start a zero-voltage count for a predetermined time, and wherein the predetermined time is greater than or equal to one second and less than or equal to three seconds.

2. The wireless power transmission apparatus of claim 1, further comprising:
an upper glass arranged to receive the target object; and
a user input unit configured to receive the selection of the mode of operation.

3. The wireless power transmission apparatus of claim 2, wherein the controller is further configured to enter the target object detection mode to control the operation frequency and determine (i) whether the target object is the induction heating device comprising a device without a reception coil or a heating container, (ii) whether the target object is the device from among the first group of devices including the device with the reception coil, (iii) whether the target object is a foreign object, or (iv) whether no device is present.

4. The wireless power transmission apparatus of claim 3, wherein, based on amplitude of main power input at a time point when the amplitude of the main power has a reference value with respect to the integrated value of the input current being smaller than the reference value, the controller is configured to extend the integrated value of the input current and compensate for a difference.

5. The wireless power transmission apparatus of claim 4:
wherein, based on the integrated value of the input current being equal to or greater than a first value, the target object is determined as the heating container,
wherein, based on the integrated value of the input current being equal to or less than a second value, the target object is determined as the device from the first group, and
wherein, based on the integrated value of the input current being between the first value and the second value, the target object is determined as the device without the reception coil.

6. The wireless power transmission apparatus of claim 5, wherein, based on the target object being determined as the device from the first group, the controller is configured to:
perform, after the target object detection mode, communication pairing with the target object,
receive induction voltage information from the target object through the communication pairing, and
determine whether the target object is the device with the reception coil from the first group.

7. The wireless power transmission apparatus of claim 6, wherein, based on the induction voltage information being equal to or greater than a first threshold value, the controller is configured to determine that the target object is the device with the reception coil.

8. The wireless power transmission apparatus of claim 7, wherein, based on the target object being determined (i) as the device from the first group and (ii) not as the device with the reception coil, the wireless power transmission mode is terminated.

9. The wireless power transmission apparatus of claim 7, wherein, based on the target object being determined as the device without the reception coil, the controller is further configured to enter a recheck mode prior to the normal wireless power transmission mode, and
wherein the controller is configured to, in the recheck mode, receive induction voltage information of the target object through the communication pairing and determine whether the target object is the device without the reception coil.

10. A method of operating a wireless power transmission apparatus for induction heating including a working coil that is configured to change operation based on selection of a mode of operation from among a plurality of operating modes, the plurality of operating modes including a wireless power transmission mode configured to wirelessly transmit power and a heating mode configured to heat one or more objects, the method comprising:
checking whether the wireless power transmission mode or the heating mode is selected;
a preparation operation including:
detecting a target object, and
determining, in the wireless power transmission mode, whether the target object is (i) a device from among a first group of devices including a device with a reception coil or (ii) an induction heating device; and
a normal operation mode operation including:
performing, based on the target object being determined as the device with the reception coil, the wireless power transmission,
wherein the preparation operation further includes a target object detection operation comprising:
reading input current of an inverter a plurality of times for a predetermined time,
performing integration on the input current, and
determining the target object based on an integrated value of the input current,
wherein the input current is counted at a zero-voltage point of a main power supply,
wherein a zero-voltage count is started for a predetermined time, and
wherein the predetermined time is greater than or equal to one second and less than or equal to three seconds.

11. The method of claim 10, wherein the preparation operation further includes:
the target object detection operation including:
detecting the input current of the inverter while driving the inverter at a first operation frequency, and
determining (i) whether the target object is the induction heating device comprising a device without a reception coil or a heating container, (ii) whether the target object is the device from among the first group of devices including the device with the reception coil, (iii) whether the target object is a foreign object, or (iv) whether no device is present; and
an additional detection operation including:
changing the operating frequency to a second driving frequency,
receiving information from the target object, and determining, based on the target object being determined as the device from the first group, whether the target object is the device with the reception coil.

12. The method of claim 11, wherein the target object detection operation includes:
based on amplitude of main power input at a time point when the amplitude of the main power has a reference value with respect to the integrated value of the input current being smaller than the reference value, extending the integrated value of the input current and compensating for a difference.

13. The method of claim 12, wherein the target object detection operation includes:
based on the integrated value of the input current being equal to or greater than a first value, determining the target object as the heating container,
based on the integrated value of the input current being equal to or less than a second value, determining the target object as the device from the first group, and
based on the integrated value of the input current being between the first value and the second value, determining the target object as the device without the reception coil.

14. The method of claim 11, wherein the additional detection operation further includes:
performing communication pairing with the target object,
receiving induction voltage information from the target object through the communication pairing, and
determining whether the target object is the device with the reception coil.

15. The method of claim 14, wherein, based on the induction voltage information being equal to or greater than a first threshold value, the target object is determined as the device with the reception coil.

16. The method of claim 15, wherein, based on the target object being determined (i) as the device from the first group and (ii) not as the device with the reception coil, the wireless power transmission mode is terminated.

* * * * *